(12) United States Patent
Baney (10) Patent No.: US 12,387,427 B2
(45) Date of Patent: Aug. 12, 2025

(54) LIGHT FIELD CAMERA SYSTEM AND METHOD OF SETTING BASELINE AND CONVERGENCE DISTANCE

(71) Applicant: LEIA INC., Menlo Park, CA (US)

(72) Inventor: Arthur Z. Baney, Union City, CA (US)

(73) Assignee: LEIA SPV LLC, Menlo Park, CA (US)

( * ) Notice: Subject to any disclaimer, the term of this patent is extended or adjusted under 35 U.S.C. 154(b) by 233 days.

(21) Appl. No.: 18/229,605

(22) Filed: Aug. 2, 2023

(65) Prior Publication Data

US 2023/0410419 A1      Dec. 21, 2023

Related U.S. Application Data (63) Continuation of application No. PCT/US2022/014613, filed on Jan. 31, 2022.
(Continued)

(51) Int. Cl.
*G06T 17/00* (2006.01)
*H04N 13/351* (2018.01)
(Continued)

(52) U.S. Cl.
CPC ........... *G06T 17/00* (2013.01); *H04N 13/351* (2018.05); *H04N 23/90* (2023.01); *H04N 23/957* (2023.01)

(58) Field of Classification Search
CPC ...... G06T 17/00; H04N 13/351; H04N 23/90; H04N 23/957; H04N 13/359;
(Continued)

(56) References Cited

U.S. PATENT DOCUMENTS

| 5,065,236 A | 11/1991 | Diner |
| 9,025,007 B1 * | 5/2015 | Parsons ................ H04N 13/275 348/47 |

(Continued)

FOREIGN PATENT DOCUMENTS

| CA | 3208318 | 8/2022 |
| CN | 116830570 | 9/2023 |

(Continued)

OTHER PUBLICATIONS

"Japanese Application Serial No. 2023-548559, Response filed Jan. 8, 2025 to Notification of Reasons for Refusal mailed Oct. 8, 2024", w English claims, 13 pgs.

(Continued)

*Primary Examiner* — King Y Poon
*Assistant Examiner* — Patrick P Galera
(74) *Attorney, Agent, or Firm* — Schwegman, Lundberg & Woessner, P.A.

(57) ABSTRACT

A light field camera system and method of setting a baseline and a convergence distance of a multiple camera rig employ sample point depths to determine and set values with respect to a three-dimensional (3D) scene. A baseline and a convergence distance of a multiple camera rig is set by determining a plurality of sample point depths representing distances between the multiple camera rig and a plurality of sample points in the 3D scene within a field of view of the multiple camera rig. The convergence distance is set to be an average sample point depth of the plurality of sample point depths. The baseline is then set as a negative inverse of a difference between a minimum sample point depth of the plurality of sample point depths and the convergence distance. The light field camera system includes a multiple camera rig comprising a plurality of cameras.

21 Claims, 6 Drawing Sheets

Related U.S. Application Data (60) Provisional application No. 63/148,587, filed on Feb. 11, 2021.

(51) Int. Cl.
  *H04N 23/90* (2023.01)
  *H04N 23/957* (2023.01)

(58) Field of Classification Search
  CPC ......... H04N 13/239; H04N 2013/0081; H04N 13/282; H04N 13/296; H04N 13/243; H04N 13/279; H04N 13/271
  See application file for complete search history.

(56) References Cited

U.S. PATENT DOCUMENTS

| | | | |
|---|---|---|---|
| 9,497,380 | B1* | 11/2016 | Jannard ................. H04N 23/90 |
| 10,484,662 | B2 | 11/2019 | Fattal |
| 2014/0002452 | A1 | 1/2014 | Evin et al. |
| 2014/0218490 | A1 | 8/2014 | Norkin et al. |
| 2014/0320606 | A1 | 10/2014 | Zhen et al. |
| 2017/0150116 | A1 | 5/2017 | Nolan et al. |
| 2018/0342075 | A1* | 11/2018 | Wang ................... H04N 13/139 |
| 2020/0322590 | A1 | 10/2020 | Fattal et al. |

FOREIGN PATENT DOCUMENTS

| | | |
|---|---|---|
| EP | 4292279 | 12/2023 |
| JP | 2003348621 | 12/2003 |
| JP | 2005353047 | 12/2005 |
| JP | 2011525657 | 9/2011 |
| JP | 2012220603 | 11/2012 |
| JP | 2013105002 | 5/2013 |
| JP | 2013138442 | 7/2013 |
| JP | 2019193002 | 10/2019 |
| JP | 2023550074 | 11/2023 |
| JP | 2023551991 | 12/2023 |
| JP | 2024507138 | 2/2024 |
| KR | 101244866 B1 | 3/2013 |
| KR | 20230121868 | 8/2023 |
| KR | 102686659 | 7/2024 |
| TW | 202247648 | 12/2022 |
| TW | 1815300 | 9/2023 |
| WO | 2022125128 A1 | 6/2022 |
| WO | 2022173611 | 8/2022 |
| WO | 2022182369 A1 | 9/2022 |
| WO | 2022182376 A1 | 9/2022 |

OTHER PUBLICATIONS

"Canadian Application Serial No. 3,208,318, Response filed Feb. 28, 2025 to Examiners Rule 86(2) Report mailed Nov. 1, 2024", 8 pgs.

"Japanese Application Serial No. 2023-548559, Notification of Reasons for Refusal mailed Oct. 8, 2024", W English Translation, 8 pgs.

"European Application Serial No. 22753133.2, Extended European Search Report mailed Nov. 15, 2024", 11 pgs.

"Canadian Application Serial No. 3,208,318, Examiners Rule 86(2) Report mailed Nov. 1, 2024", 3 pgs.

Koichi, Hashimoto, "Vision and Control", vision, Japan, [Online] Retrieved from the internet:http: ishikawa-vision.org ~koichi Lecture Pattern 2001 vs1.pdf, (2001), 1-32.

Senoh, Takanori, "3-7 MPEG Multi-View Image Coding Standardization", National Institute of Information and Communications Technology quarterly report vol. 56 Nos. 1 2 2010, Japan, [Online] Retrieved from the internet:https: www.nict.go.jp publication shuppan kihou-journal kihou-vol56no1_2 0307.pdf, (2010), 79-90.

Wang, Lei, "Research on the Method of Parallax adjustment for Active Stereo Camera Systems", Journal of the Institute of Electrical Engineers of Japan C (an electron and an information system section magazine) vol. 135 No. 9, [Online] Retrieved from the internet:https: www.jstage.jst.go.jp article ieejeiss 135 9 135_1120 _pdf, (Apr. 6, 2015), 1120-1130.

International Search Report and Written Opinion (ISRWO) by International Searching Authority (ISA) Korean Intellectual Property Office (KIPO) dated May 10, 2022 (8 pages) for foreign counterpart parent International Application No. PCT/US2022/014613.

"International Application Serial No. PCT US2022 014613, International Preliminary Report on Patentability mailed Aug. 24, 2023", 5 pgs.

"European Application Serial No. 22753133.2, Response to Communication pursuant to Rules 161(2) and 162 EPC filed Mar. 28, 2024", 25 pgs.

"Canadian Application Serial No. 3,208,318, Voluntary Amendment filed Jul. 13, 2023", 35 pgs.

"Taiwanese Application Serial No. 111104484, Office Action mailed Dec. 9, 2022", w English Translation, 11 pgs.

"Taiwanese Application Serial No. 111104484, Response filed Mar. 10, 2023 to Office Action mailed Dec. 9, 2022", 3 pgs.

"Taiwanese Application Serial No. 111104484, Office Action mailed Jun. 14, 2022", 2 pgs.

"European Application Serial No. 22753133.2, Response filed Apr. 16, 2025 to Extended European Search Report mailed Nov. 15, 2024", 9 pgs.

"Japanese Application Serial No. 2023-548559, Notification of Reasons for Refusal mailed Apr. 22, 2025", w English translation, 6 pgs.

* cited by examiner

LIGHT FIELD CAMERA SYSTEM AND METHOD OF SETTING BASELINE AND CONVERGENCE DISTANCE

CROSS-REFERENCE TO RELATED APPLICATIONS

This application is a continuation patent application of and claims priority to International Patent Application No. PCT/US2022/014613, filed Jan. 31, 2022, which claims the benefit of priority to U.S. Provisional Patent Application Ser. No. 63/148,587, filed Feb. 11, 2021, the entirety of each of which is incorporated by reference herein.

STATEMENT REGARDING FEDERALLY SPONSORED RESEARCH OR DEVELOPMENT

N/A

BACKGROUND

A scene in three-dimensional (3D) space may be viewed from multiple perspectives depending on the viewing angle. In addition, when viewed with stereoscopic vision, multiple views representing different perspectives of the scene may be perceived contemporaneously, effectively creating a sense of depth that may be perceived by a viewer. Multiview displays present images having multiple views to represent how scenes are perceived in the 3D world. A multiview display renders different views contemporaneously to provide a realistic experience to the user. Multiview images may be generated and processed dynamically by software. Capturing multiview images may involve multiple cameras or camera positions.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments may have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide techniques to set both baseline and convergence distance of a camera rig used to capture multiview images of a three dimensional (3D) scene. In particular, according to various embodiments, the baseline and convergence distance of a multiple camera rig may be determined based on three-dimensional (3D) content captured by a multiple camera rig. In turn, the baseline and a convergence distance may be dynamically adjusted based on the 3D content visible to one or more cameras of the multiple camera rig as the 3D content changes. According to various embodiments, setting the baseline and convergence distance may employ either physical cameras for capturing light field images and video or virtual cameras such as those found in any of a variety of rendering engines (e.g., 3D modeling/animation software, game engines, video editing tools).

As explained below, rather than using a preset baseline and convergence distance or manually adjusted the baseline and the convergence distance, embodiments are directed to modifying these parameters depending on the various depths of a scene within a view of a camera or more particularly one or more cameras of a multiple camera rig. The camera or cameras, in turn, may be either a virtual camera(s) or an actual or physical camera(s). When implemented in a renderer, the virtual camera may be positioned to capture a 3D scene of a portion of a 3D model. A renderer may be a gaming engine, 3D model player, video player, or other software environment that positions a virtual camera to capture a 3D model.

According to various embodiments, a camera generally has a particular location (e.g., coordinates) and a direction to capture a view representing the 3D scene of the 3D model. In this respect, there are a plurality of depths (sample point depths) between the camera and the various surfaces of the 3D scene within the view of the camera. To generate a multiview image, a plurality of cameras or 'multiple camera rig' captures varying, overlapping views of the 3D scene. In some embodiments that employ virtual cameras, the virtual camera (e.g., reference camera) may be replicated (e.g., spawned, copied), to generate the multiple camera rig that captures varying, overlapping views of the 3D scene from, for example, a 3D model. In other embodiments, the multiple camera rig comprises physical or actual cameras configured to capture an image representing different views of a physical or actual 3D scene. In these embodiments, the depths represent actual or physical depths within the physical 3D scene.

Figure 1A:
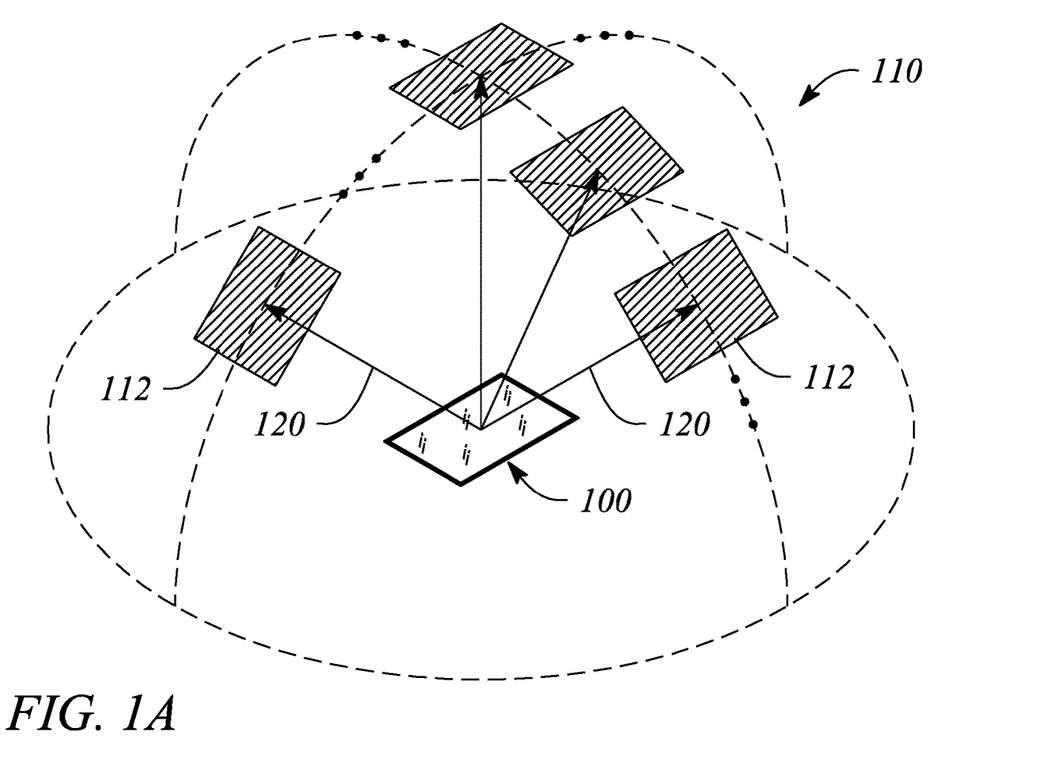
FIG. 1A illustrates a perspective view of a multiview display in an example, according to an embodiment consistent with the principles described herein.

FIG. 1A illustrates a perspective view of a multiview display 100 (or multiview mode of a multimode display) in an example, according to an embodiment consistent with the principles described herein. As illustrated in FIG. 1A, the multiview display 100 comprises a screen configured to display a multiview image 110 to be viewed. The multiview display 100 provides different views 112 of the multiview image in different view directions 120 relative to the screen of the multiview display 100. The view directions 120 are illustrated as arrows extending from the screen in various different principal angular directions; the different views 112 are illustrated as shaded polygonal boxes at the termination of the arrows (i.e., depicting the view directions 120); and only four views 112 and four view directions 120 are illustrated, all by way of example and not limitation. Note that while the different views 112 are illustrated in FIG. 1A as being above the screen, the views 112 actually appear on or in a vicinity of the screen when the multiview image 110 is displayed on the multiview display 100. Depiction of the views 112 above the screen of the multiview display 100 in FIG. 1A is only for simplicity of illustration and is meant to represent viewing the multiview display 100 from a respective one of the view directions 120 corresponding to a particular view 112. As illustrated the multiview display 100 configured to display a multiview image 110 may be or serve as a display (e.g., a display screen) of a telephone (e.g., mobile telephone, smart phone, etc.), a tablet computer, a laptop computer, a computer monitor of a desktop computer, a camera display, or an electronic display of substantially any other device, according to various embodiments.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
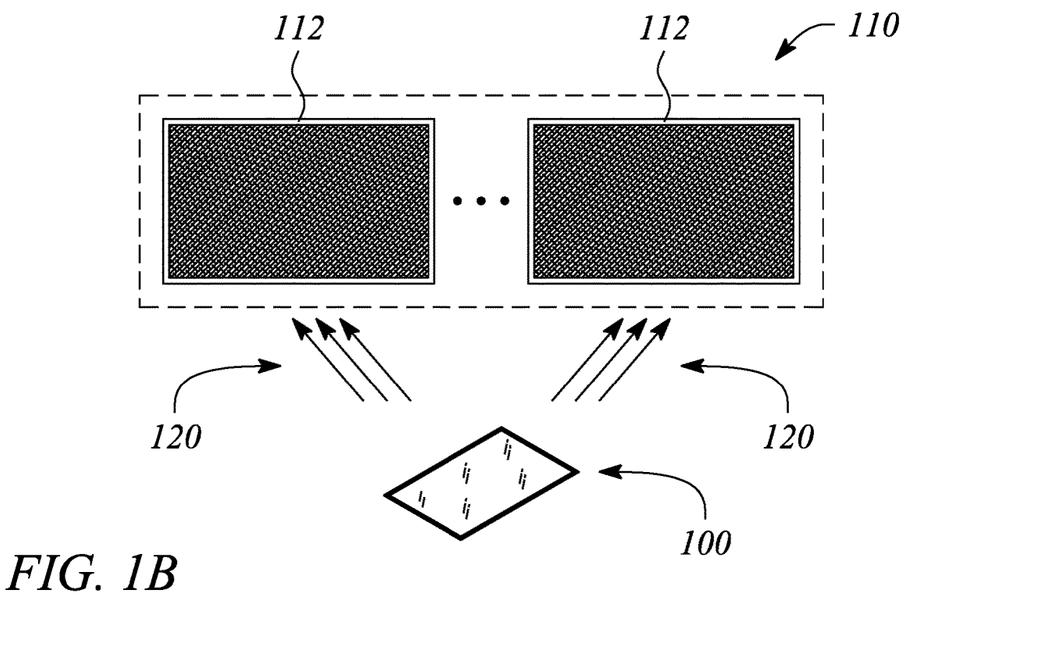
FIG. 1B illustrates displaying a multiview image using a multiview display in an example, according to an embodiment consistent with the principles described herein.

FIG. 1B illustrates displaying a multiview image 110 using a multiview display 100 in an example, according to an embodiment consistent with the principles described herein. The multiview image 110 has a plurality of views 112. Each of the views 112 corresponds to a different view direction 120 or perspective of scene. The views 112 are rendered for display by a multiview display 100. As such, each view 112 represents a different viewing angle of the multiview image 110. The different views 112 therefore have some level of disparity with respect to one another. In some embodiments, a viewer may perceive one view 112 with a right eye while perceiving a different view 112 with a left eye. This allows the viewer to perceive different views simultaneously and may result in stereoscopic vision. In other words, the different views 112 create a three-dimensional (3D) effect.

In some embodiments, as a viewer physically changes a viewing angle with respect to the multiview display 100, the eyes of the viewer may encounter different views 112 of the multiview image 110 at different points in time as the viewing angle changes. As a result, the viewer may interact with the multiview display 100 by changing the viewing angle to see different views 112 of the multiview image 110. For example, as the viewer moves to the left, the viewer may see more of the left side of an object in the multiview image 110. According to various embodiments, the multiview image 110 may have multiple views 112 along a horizontal plane or axis providing a so-called 'horizontal-parallax-only' (HPO) 3D multiview image, while in other embodiments, the multiview image 110 may have multiple views 112 along both the horizontal axis and a vertical plane or axis resulting in a so-called 'full parallax' 3D multiview image. Thus, as a viewer changes the viewing angle to see different views 112, the viewer may gain additional visual details within the multiview image 110. When processed for display, the multiview image 110 is stored as data in a format that records the different views 112, according to various embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions contemporaneously from the user's perspective. In particular, the different views 112 may represent different perspective views of a multiview image 110.

As is described in more detail below, the multiview display 100 may be implemented using a variety of technologies that accommodate the presentation of different image views so that they are perceived contemporaneously. One example of a multiview display is one that employs diffraction gratings to control the principle angular directions of the different views 112. According to some embodiments, the multiview display 100 may be a light field display, which is one that presents a plurality of light beams of different colors and different directions corresponding to different views. In some examples, the light field display is a so-called 'glasses free' three-dimensional (3D) display that may use diffractive gratings or multibeam elements to provide autostereoscopic representations of multiview images without the need for special eye wear to perceive depth. In some embodiments, the multiview display 100 may require glasses or other eyewear to control which views 112 are perceived by each eye of the user.

In some embodiments, the multiview display 100 is part of a multiview display system that renders multiview images and 2D images. In this respect, the multiview display system may include a plurality of backlights to operate in different modes. For example, the multiview display system may be configured to provide broad-angle emitted light during a 2D mode using a broad-angle backlight. In addition, the multiview display system may be configured to provide directional emitted light during a multiview mode using a multiview backlight having an array of multibeam elements, the directional emitted light comprising a plurality of directional light beams provided by each multibeam element of the multibeam element array. The multiview display system may be configured to time multiplex the 2D and multiview modes using a mode controller to sequentially activate the broad-angle backlight during a first sequential time interval corresponding to the 2D mode and the multiview backlight during a second sequential time interval corresponding to the multiview mode. Directions of directional light beams of the directional light beam may correspond to different view directions of a multiview image.

For example, in 2D mode, the broad-angle backlight may generate images so that the multiview display system operates like a 2D display. By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be greater than about sixty degrees (e.g., >±60°).

The multiview mode may use a multiview backlight instead of a broad-angle backlight. The multiview backlight may have an array of multibeam elements that scatter light as plurality of directional light beams having principal angular directions that differ from one another. For example, if the multiview display 100 operates in a multiview mode to display a multiview image having four views, the multiview backlight may scatter light into four directional light beams, each directional light beam corresponding to a different view. A mode controller may sequentially switch between 2D mode and multiview mode so that a multiview image is displayed in a first sequential time interval using the multiview backlight and a 2D image is displayed in a second sequential time interval using the broad-angle backlight.

In some embodiments, the multiview display system is configured to guide light in a light guide as guided light. Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide. The light guide may be shaped like a plate or slab. The light guide may be edge lit by a light source (e.g., light emitting device).

In some embodiments, the multiview display system is configured to scatter out a portion of the guided light as the directional emitted light using multibeam elements of the multibeam element array, each multibeam element of the multibeam element array comprising one or more of a diffraction grating, a micro-refractive element, and a micro-reflective element. In some embodiments, a diffraction grating of a multibeam element may comprise a plurality of individual sub-gratings. In some embodiments, a micro-reflective element is configured to reflectively couple or scatter out the guided light portion as the plurality of directional light beams. The micro-reflective element may have a reflective coating to control the way guided light is scattered. In some embodiments, the multibeam element comprises a micro-refractive element that is configured to couple or scatter out the guided light portion as the plurality of directional light beams by or using refraction (i.e., refractively scatter out the guided light portion).

Figure 2:
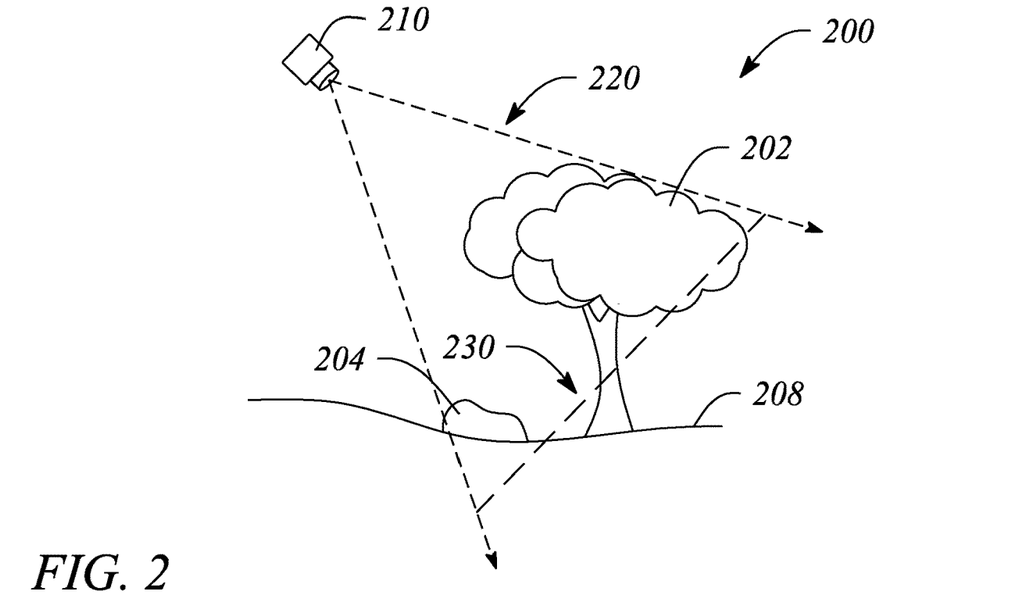
FIG. 2 illustrates capturing a multiview image of a three dimensional (3D) scene in an example, according to an embodiment consistent with the principles described herein.

FIG. 2 illustrates capturing a multiview image of a three dimensional (3D) scene 200 in an example, according to an embodiment consistent with the principles described herein. As illustrated in FIG. 2, the 3D scene 200 contains various objects (e.g., physical or virtual) such as a tree 202 and a rock 204 on the ground 208. The tree 202, the rock 204, and the ground 208 may be referred to as objects, which together, form at least part of a 3D scene 200. The multiview image of the 3D scene 200 may be displayed and viewed in a manner like the manner discussed with respect to FIGS. 1A-1B. To capture the multiview image, a camera(s) 210 may be used. In some embodiments, the camera 210 may include one or more physical cameras. For example, a physical camera includes a lens for capturing light and recording the light as an image. Multiple physical cameras may be used to capture different views of the scene to create the multiview image. For example, each physical camera may be spaced apart at a defined distance to allow different perspectives of the objects in the scene to be captured. The distance between the different physical cameras allows for the ability to capture depth of the 3D scene 200, the same way that the distance between a viewer's eyes allow for 3D vision.

The camera 210 may also represent one or more a virtual (e.g., simulated or hypothetical) cameras as opposed to a physical camera. The 3D scene 200 may be generated using computer graphics techniques that manipulate computer-generated information. In this example, the camera 210 is implemented as a virtual camera having a point of view to capture the 3D scene 200. The virtual camera may be defined in terms of viewing angle and coordinates within a 3D model. The 3D model may define various objects (e.g., the tree 202, the rock 204, and the ground 208) that are captured by the virtual camera(s).

When generating or capturing views of a scene using the camera 210, the camera may be configured according to a plane of convergence 230. A 'plane of convergence' or 'convergence plane' is defined as a plurality of locations where the different views align such that there is little to no disparity between the different views. The plane of convergence 230 occurs in front of the camera 210. Objects between the camera 210 and the plane of convergence 230 appear closer to the viewer while objects behind the plane of convergence 230 appear further away from the viewer. In this respect, the degree of disparity between the different views increases the further the object is positioned away from the plane of convergence 230. Objects along the plane of convergence 230 appear in focus with respect to the viewer. The distance between the camera 210 and the plane of convergence 230 is referred to as the convergence distance or convergence offset. As the camera 210 changes position or direction or as the scene changes, the convergence distance is dynamically updated as described herein, The camera 210 captures a scene that falls within the frustum 220 of the camera 210. The frustum 220 is shown to have an upper bound and a lower bound that define the viewing angle range of the 3D scene 200. In FIG. 2, the plane of convergence 230 intersects the bottom of the tree 202 and the back of the tree 202 (relative to the camera 210). As a result, the bottom of the tree 202 appears to be in focus and will appear as the featured point of interest to a viewer as it appears to be located on the display. In addition, the rock 204 may appear in a foreground in front of the tree 202.

As used herein, 'disparity' is defined as the difference between at least two views of a multiview image at corresponding locations. For example, in the context of stereoscopic vision, the left eye and right eye may see the same object but at slightly different locations due to the difference in viewing angles between the eyes. This difference may be quantified as disparity. The change in disparity across the multiview image conveys a sense of depth.

The terms 'baseline' or 'camera baseline' are defined as the distance between two cameras that capture corresponding views of a multiview image. For example, in the context of stereoscopic vision, the baseline is the distance between the left eye and right eye. A larger baseline leads to increased disparity and may enhance the 3D effect of the multiview image. Scaling the baseline or baseline scaling refers to changing or adjusting the baseline according to a multiplier to either reduce or increase the baseline. Herein, pairs of cameras of a multiple camera rig are spaced apart from one another by a baseline, by definition. In some embodiments, a common baseline is used between each pair of cameras of the multiple camera rig.

Herein 'convergence distance' or 'convergence offset' refers to the distance between the camera and point along the plane of convergence, by definition. Modifying the convergence offset will change the location of the plane of convergence so as to refocus the multiview image on new objects at a different depth.

Further herein, a '3D scene' refers to a scene containing one or more 3D objects that may exist in physical space or may be virtually represented as a 3D model or 3D environment. A physical 3D scene may be captured by physical cameras while a virtual 3D scene may be captured by virtual cameras.

Further, as used herein, the article 'a' is intended to have its ordinary meaning in the patent arts, namely 'one or more'. For example, 'a camera' means one or more cameras and as such, 'the camera' means 'the camera(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
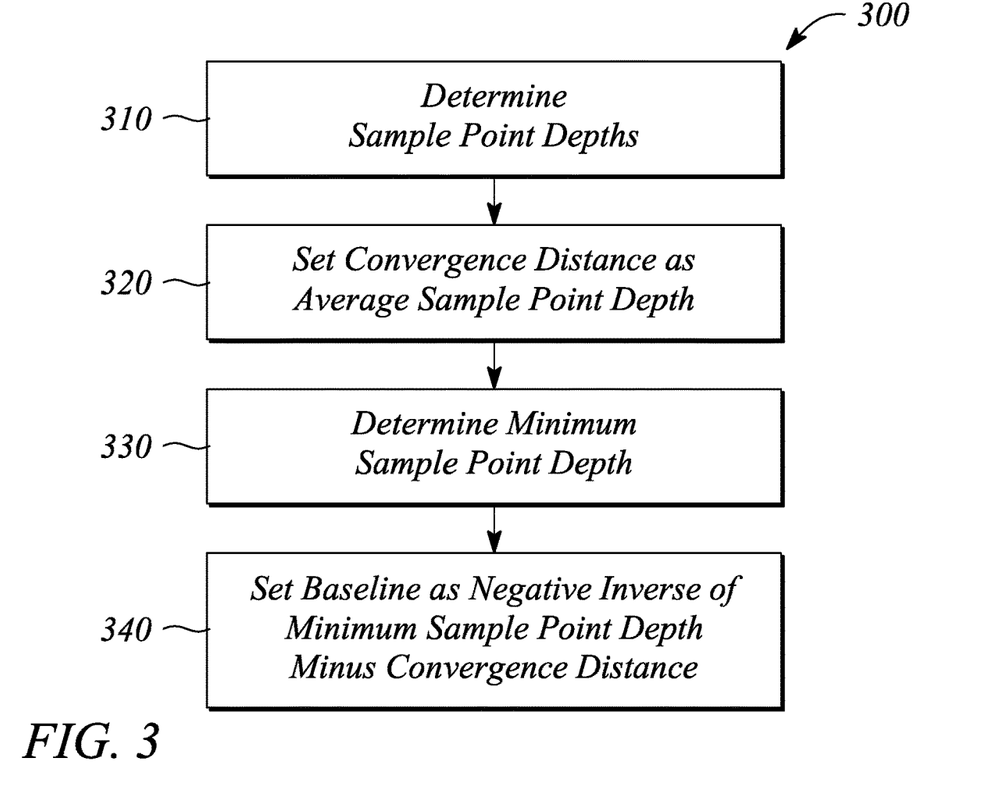
FIG. 3 illustrates a flow chart of a method of setting a baseline and a convergence distance of a multiple camera rig in an example, according to an embodiment of the principles described herein.

According to some embodiments of the principles described herein, a method of setting a baseline and a convergence distance of a multiple camera rig is provided. FIG. 3 illustrates a flow chart of a method 300 of setting a baseline and a convergence distance of a multiple camera rig in an example, according to an embodiment of the principles described herein. In some embodiments, the method 300 of setting a baseline and a convergence distance of a multiple camera rig may be used to dynamically adjust both the baseline and convergence distance of the multiple camera rig. For example, baseline adjustment or baseline scaling along with convergence distance adjustment may be implemented in real-time, according to some embodiments.

As illustrated, the method 300 of setting a baseline and a convergence distance of a multiple camera rig comprises determining 310 a set or a plurality of sample point depths. According to various embodiments, the sample point depths represent a collection or plurality of distances between the multiple camera rig and a plurality of sample points in a three dimensional (3D) scene. For example, the 3D scene may be a scene that is within a field of view of the multiple camera rig (e.g., visible to cameras of the multiple camera rig), and the distances may represent distances to various objects or points of interest within the 3D scene.

In some embodiments, determining 310 a plurality of sample point depths may comprise performing ray casting within the 3D scene. For example, a grid of ray casts may be generated outwards from the multiple camera rig toward the 3D scene. Hit distances to various colliders in the 3D scene are then recorded for the ray casts in the ray cast grid. The hit distances correspond to the depths of the various colliders within the 3D scene.

Figure 4:
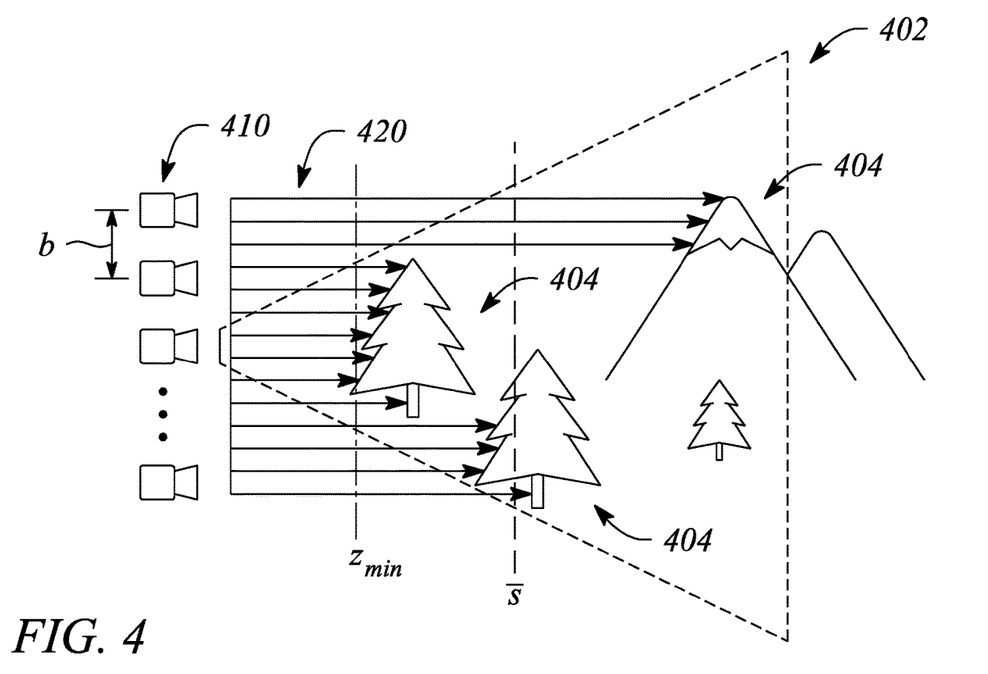
FIG. 4 illustrates ray casting in an example, according to an embodiment of the principles described herein.

FIG. 4 illustrates ray casting in an example, according to an embodiment of the principles described herein. As illustrated, a 3D scene 402 includes a plurality of objects 404 while a multiple camera rig 410 is positioned to capture an multiview image the 3D scene 402. Ray casting comprises generating a plurality or grid of rays 420 and directing the rays into the 3D scene 402 where individual rays 420 encounter points on the objects 404, as illustrated by arrow in FIG. 4. As illustrated, hit distances are lengths of the rays 420 extending between an origin point at the multiple camera rig 410 and a point at which the ray 420 encounters (i.e., terminates on) a particular object 404. The hit distances for the grid of rays provided by ray casting then determines 310 the plurality of sample point depths (or distances). FIG. 4 also illustrates a baseline b between adjacent cameras of the multiple camera rig 410.

In other embodiments, determining 310 a plurality of sample point depths may comprise computing the depths from a disparity map of the 3D scene. The disparity map may be provided along with an image of the scene, in some embodiments. In other embodiments, the disparity map may be computed from a visual disparity between images recorded by different cameras of the multiple camera rig. In particular, computing the depths may comprise using image disparity between images captured by the different cameras of the multiple camera rig. For example, a depth buffer associated with images of the 3D scene captured by cameras of the multiple camera rig may be interrogated. Computing the depths may further comprise forming a disparity map of the 3D scene from the image disparity, in some embodiments.

In yet other embodiments, determining 310 a plurality of sample point depths may comprise using a depth sensor to measure distances between the multiple camera rig and objects within the 3D scene. In various embodiments, the objects may correspond to sample points of the plurality of sample points and the depth sensor may comprise any of a variety of depth sensors. For example, the depth sensor may be a laser distance sensor including, but not limited to, a laser detection and ranging (LIDAR) system. In another example, the depth sensor may be a time-of-flight distance sensor. In yet another example, a ranging or depth measuring system that employs either sound waves (e.g., a sound navigation and ranging or 'SONAR' system) or structured light. For example, an image with different colors at different heights may be projected onto the scene, and then an image captured of the scene by a camera may be used by an algorithm to generate a depth map by assigning depths based on the colors of each pixel. Even robots with 3D tracking may be used to effectively explore or 'roll' over a landscape and record heights or distances, etc., may be used to determine the sample point depths.

As illustrated in FIG. 3, the method 300 of setting a baseline and a convergence distance of a multiple camera rig further comprises setting 320 the convergence distance to be an average depth of the plurality of sample point depths. In particular, an average of sample point depths of a plurality of the sample point depths is computed. The convergence distance is then set to be equal to the computed average of the sample point depths. In some embodiments, the plurality of sample point depths comprises depths of all of the sample points. In other embodiments, the plurality of sample point depths may comprise a selection of the sample point depths that is smaller than a total number of the sample points, e.g., the set may include only sample points that are considered to be relevant or important, e.g., sample points associated with major objects or colliders in the 3D scene. In another embodiment (e.g., for large 3D models), the plurality of sample points depths may be determined for a subset of the plurality of vertices (e.g., every other or every third vertex). Referring again to FIG. 4, an average sample depths is illustrated as an average ray cast hit distance.

In some embodiments, the average depth of the plurality of sample points is a weighted average. According to various embodiments, the weighted average $\overline{S}$ may be computed using equation (1)

$$\overline{S} = \frac{1}{n}\sum_{i=1}^{n} w_i \cdot s_i \tag{1}$$

where n is a number of sample points in the plurality of sample points, s are the individual sample points of the plurality of sample points, and $w_i$ are the weights of the weighted average $\overline{S}$.

According to some embodiments, the weights $w_i$ of the weighted average $\overline{S}$ may be selected or assigned based on a distance of the various sample points $s_i$ from a predetermined location or a particular object within the 3D scene. For example, the weights $w_i$ may be selected or determined based on a distance of an $i^{th}$ sample point $s_i$ from a center of the scene. In another example, the weights $w_i$ may be selected or assigned based on a distance of the $i^{th}$ sample point $s_i$ from a point of focus (focal point) of the cameras within the multiple camera rig. In yet another example, the weights $w_i$ may be selected or assigned based on a distance of the $i^{th}$ sample point $s_i$ from a particular sample point s* (e.g., a sample point on or associated with an object of interest within the 3D scene).

In some embodiments, the weights $w_i$ of the weighted average $\overline{S}$ may decrease as a function of the distance, e.g., a distance from the scene center, focal point or particular sample point s*. In some embodiments, the decrease of the weights $w_i$ may have either linear distribution as function of distance or a non-linear function (e.g., an exponential distribution). In some embodiments, weights $w_i$ of the weighted average $\overline{S}$ may be assigned according to a gaussian distribution. The gaussian distribution may be centered on the scene center, the focal point, or the particular sample point s*, for example.

Referring again to FIG. 3, the method 300 of setting a baseline and a convergence distance of a multiple camera rig illustrated in FIG. 3 further comprises determining 330 a minimum sample point depth of the plurality of sample point depths. Herein, the minimum sample point depth is generally defined as the sample point having the minimum depth or distance from cameras of the multiple camera rig. The minimum sample point depth may be determined 330 by examining the plurality of sample point depths and finding or identifying the sample point having the minimum value, for example. In other examples, the minimum sample point depth may be determined 330 by identifying a group of sample points having a lowest depth (or distance) and then setting the minimum sample point depth to be equal to an average of the sample point depths in the group of lowest depth sample points. In some examples, the lowest depth sample point group may comprise a percentage of the sample points having a lowest depth or distance, e.g., about five percent (5%) or about ten percent (10%) of the sample points with the lowest depths or distances. Referring back to FIG. 4, a minimum sample point depth $z_{min}$ representing a minimum hit distance of rays 420 is illustrated.

Returning again to FIG. 3, according to various embodiments, the method 300 of setting a baseline and a convergence distance of a multiple camera rig further comprises setting 340 the baseline to be a negative inverse of a difference between the minimum sample point depth and the convergence distance, as given by equation (2), $$b = -\frac{1}{(z_{min} - D_{conv})} \tag{2}$$

where b is the baseline, $z_{min}$ is the minimum sample point depth, and $D_{conv}$ is the convergence distance, provided as described above.

According to some embodiments, the multiple camera rig may comprise a plurality of virtual cameras. For example, the 3D scene may be a 3D model and the plurality of virtual cameras may be cameras associated with or used to image the 3D model. In some embodiments, a virtual camera of the virtual camera plurality may be a virtual camera that is managed by a renderer. For example, the multiple camera rig may be associated with a renderer that uses a virtual camera of the multiple camera rig to capture a virtual 3D scene. In another embodiment, the multiple camera rig may comprise a plurality of physical cameras. For example, the 3D scene may be or represent a physical scene that is imaged by cameras of the plurality of physical cameras. In yet another embodiment, the multiple camera rig may comprise a camera (e.g., one or more cameras) that is moved between a plurality of locations to capture images that form the 3D scene. In some embodiments, the sample point depths may represent a depth or distance with respect to one camera of the multiple camera rig (e.g., a reference camera), while in other embodiments, the sample point depths may be distances with respect to the multiple camera rig as a whole. As mentioned above, FIG. 4 also illustrates the baseline b between adjacent cameras of the multiple camera rig 410.

Figure 5:
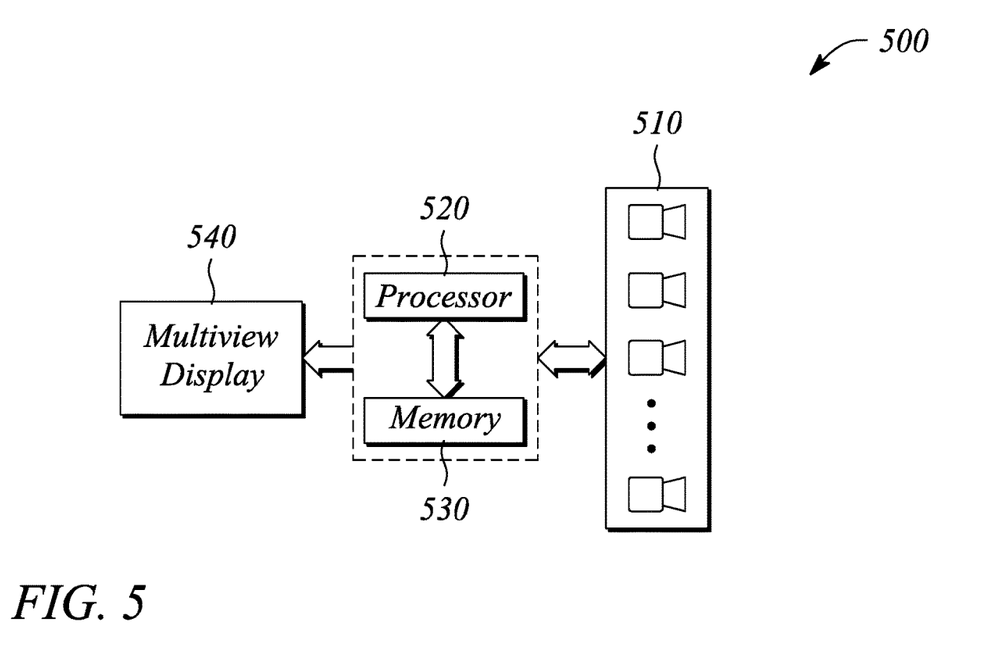
FIG. 5 illustrates a block diagram of a light field camera system in an example, according to an embodiment of the principles described herein.

In other embodiments according to the principles described herein, a light field camera system is provided. In some embodiments, the light field camera system may have or provide automatic baseline and convergence distance determination. Figure illustrates a block diagram of a light field camera system 500 in an example, according to an embodiment of the principles described herein. As illustrated in FIG. 5, the light field camera system 500 comprises a multiple camera rig 510. The multiple camera rig 510 comprises a plurality of cameras separated from one another by a baseline b, as illustrated.

The light field camera system 500 further comprises a processor 520 and a memory 530. The memory 530 is configured to store instructions that when executed by the processor 520, implement determining a set or plurality of sample point depths representing distances between the multiple camera rig and a plurality of sample points in a three dimensional (3D) scene within a field of view of the multiple camera rig. In some embodiments, determining the plurality of sample point depths may be substantially similar to determining 310 the sample point depths, as described above with respect to the method 300 of setting a baseline and a convergence distance of a multiple camera rig.

In particular, in some embodiments, the plurality of sample point depths may be determined 310 one or more of from a depth map of an image representing the 3D scene, using a disparity map to compute the depths, and performing ray casting within the 3D scene to determine the sample point depths within the 3D scene. In other embodiments, the plurality of sample point depths may be determined 310 using a depth sensor to measure distances between the multiple camera rig and objects within the 3D scene, the objects corresponding to sample points of the plurality of sample points. In some embodiments, the average depth of the plurality of sample point depths is a weighted average, weights of the weighted average being assigned according to a decreasing function of distance from a focal point of the 3D scene.

In some embodiments, a camera of the plurality of cameras is a virtual camera, the 3D scene being a 3D model. In some embodiments, cameras of the plurality of cameras of the multiple camera rig comprises physical cameras, the 3D scene representing a physical scene imaged by the physical cameras.

When executed by the processor 520 illustrated in FIG. 5, instructions stored in memory 530 further implement setting a convergence distance and baseline of the multiple camera rig. The convergence distance may be an average depth of the plurality of sample point depths and the baseline may be a negative inverse of a minimum sample point depth minus the convergence distance, according to various embodiments. In some embodiments, setting a convergences distance and baseline may be substantially similar to setting 320 a convergence distance and setting 340 a baseline of the above-described method 300 of setting a baseline and a convergence distance of a multiple camera rig.

In some embodiments, an application executed by the processor 520 may generate a 3D model using computer graphics techniques for 3D modeling. A 3D model is a mathematical representation of various surfaces and textures of different objects and may include the spatial relationship between the objects. The application may include a renderer that generates and updates the 3D model depending on user input. The user input may involve navigating through the 3D model by clicking or dragging a cursor, pressing direction buttons, converting the user's physical location to a virtual location within the 3D model, etc. The 3D model may be loaded into the memory 530 and updated thereafter. The 3D model may be converted into multiview images revealing a window into the 3D model. The window may be defined by a plurality of virtual cameras, the multiple camera rig 510 having coordinates and directions within the 3D model. The baseline and convergence distance of the virtual cameras may be dynamically updated depending on movements of the virtual cameras or the 3D scene changing, in some embodiments.

In some embodiments (e.g., as illustrated in FIG. 5), the light field camera system 500 further comprises a multiview display 540. In these embodiments, the convergence distance may correspond to a zero disparity plane of the multiview display 540.

Figure 6A:
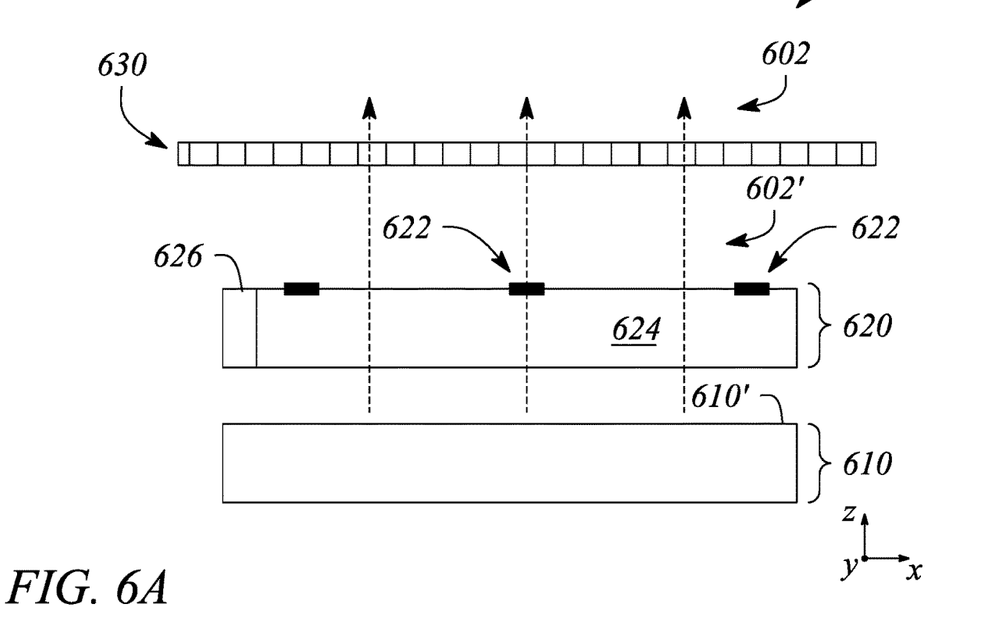
FIG. 6A illustrates a cross-sectional view of a multiview display in an example, according to an embodiment consistent with the principles described herein.
Figure 6B:
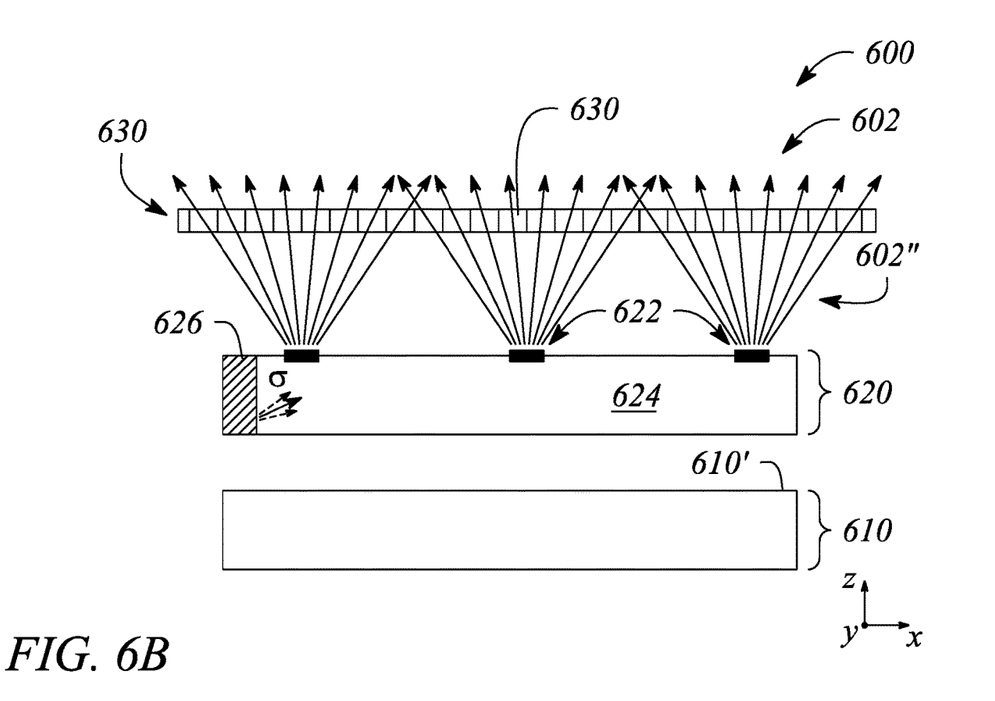
FIG. 6B illustrates a cross-sectional view of a multiview display in another example, according to an embodiment consistent with the principles described herein.
Figure 6C:
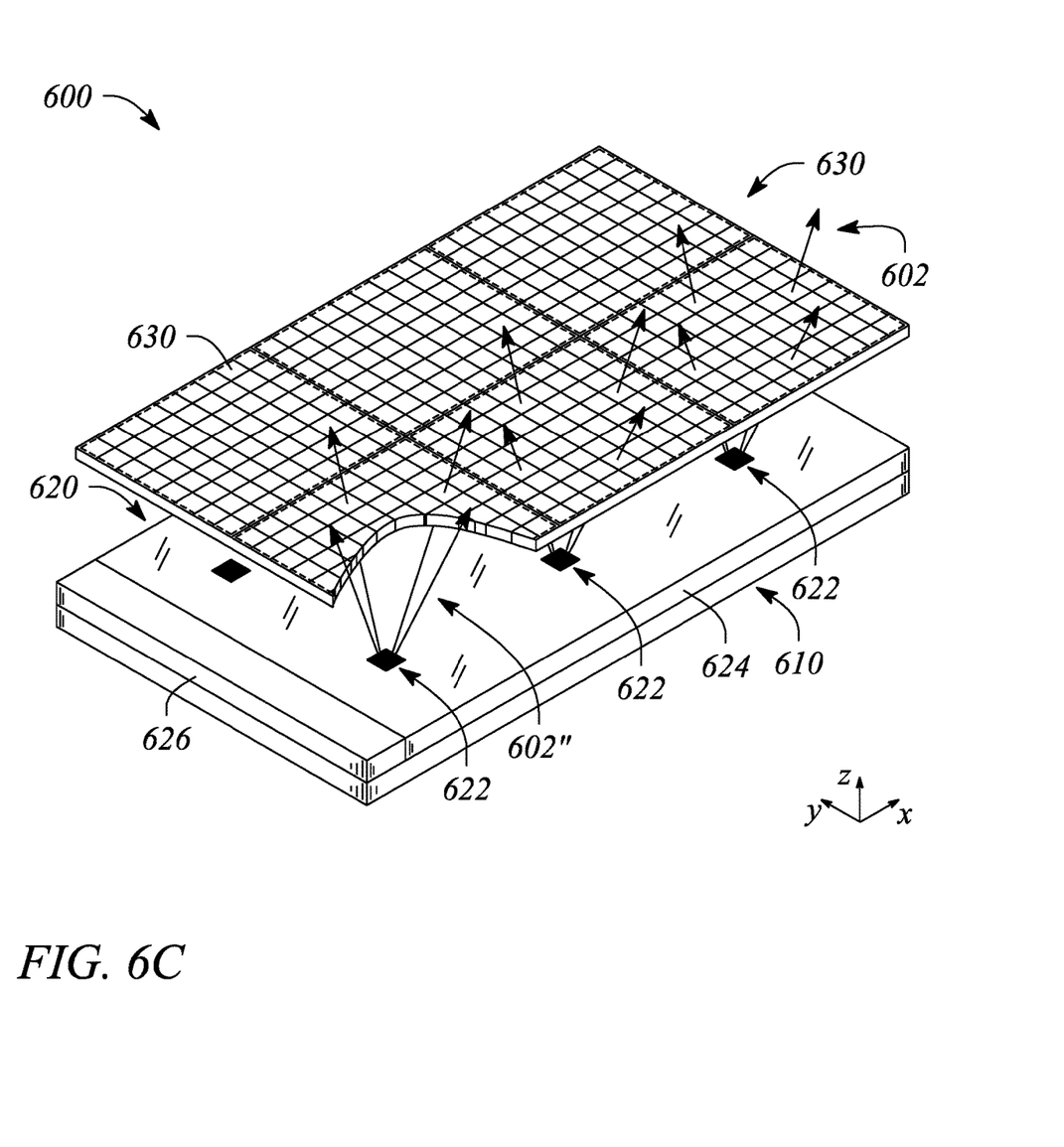
FIG. 6C illustrates a perspective view of a multiview display in an example, according to an embodiment consistent with the principles described herein.

FIG. 6A illustrates a cross-sectional view of a multiview display 600 in an example, according to an embodiment consistent with the principles described herein. FIG. 6B illustrates a cross-sectional view of a multiview display 600 in another example, according to an embodiment consistent with the principles described herein. In particular, FIG. 6A illustrates the multiview display 600 during or according to a first or two-dimensional (2D) mode. FIG. 6B illustrates the multiview display 600 during or according to a second or multiview mode. FIG. 6C illustrates a perspective view of a multiview display 600 in an example, according to an embodiment consistent with the principles described herein. The multiview display 600 is illustrated in FIG. 6C during the multiview mode, by way of example and not limitation. Further, the 2D and multiview modes may be time-multiplexed in time-sequential or time-interlaced manner to provide the 2D and multiview modes in alternating first and second time intervals (e.g., alternating between FIGS. 6A and 6B), according to various embodiments. As such, the multiview display 600 may also be referred to as a 'time-multiplexed, mode-switching' multiview display.

As illustrated, the multiview display 600 is configured to provide or emit light as emitted light 602. The emitted light 602 may be used to illuminate and provide images using the multiview display 600, according to various examples and embodiments. For example, the emitted light 602 may be used to illuminate an array of light valves (e.g., light valves 630, described below) of the multiview display 600.

According to various embodiments, directional emitted light 602" may be provided during the multiview mode comprising a plurality of directional light beams having directions corresponding to different view directions of a multiview image. Conversely, during the 2D mode, broad-angle emitted light 602' may be provided that is largely non-directional and further generally has a cone angle that is greater than a cone angle of a view of the multiview image or multiview display associated with the multiview display 600, according to various embodiments. The broad-angle emitted light 602' is illustrated in FIG. 6A as dashed arrows for ease of illustration. However, the dashed arrows representing the broad-angle emitted light 602' are not meant to imply any particular directionality of the emitted light 602, but instead merely represent the emission and transmission of light, e.g., from the multiview display 600. Similarly, FIGS. 6B and 6C illustrate the directional light beams of the directional emitted light 602" as a plurality of diverging arrows. The directional light beams may be or represent a light field, in various embodiments.

As illustrated in FIGS. 6A-6C, the time-multiplexed multimode display 600 comprises a broad-angle backlight 610. The illustrated broad-angle backlight 610 has a planar or substantially planar light-emitting surface configured to provide the broad-angle emitted light 602' (e.g., see FIG. 6A). According to various embodiments, the broad-angle backlight 610 may be substantially any backlight having a light-emitting surface 610' configured to provide light to illuminate an array of light valves of a display. For example, the broad-angle backlight 610 may be a direct-emitting or directly illuminated planar backlight. Direct-emitting or directly illuminated planar backlights include, but are not limited to, a backlight panel employing a planar array of cold-cathode fluorescent lamps (CCFLs), neon lamps or light emitting diodes (LEDs) configured to directly illuminate the planar light-emitting surface 610' and provide the broad-angle emitted light 602'. An electroluminescent panel (ELP) is another non-limiting example of a direct-emitting planar backlight. In other examples, the broad-angle backlight 610 may comprise a backlight that employs an indirect light source. Such indirectly illuminated backlights may include, but are not limited to, various forms of edge-coupled or so-called 'edge-lit' backlights.

The multiview display 600 illustrated in FIGS. 6A-6C further comprises a multiview backlight 620. As illustrated, the multiview backlight 620 comprises an array of multibeam elements 622. Multibeam elements 622 of the multibeam element array are spaced apart from one another across the multiview backlight 620, according to various embodiments. Differing types of multibeam elements 622 may be utilized in the multiview backlight 620 including, but limited to, active emitters and various scattering elements. According to various embodiments, each multibeam element 622 of the multibeam element array is configured to provide a plurality of directional light beams having directions corresponding to different view directions of a multiview image during a multiview mode.

In some embodiments (e.g., as illustrated), the multiview backlight 620 further comprises a light guide 624 configured to guide light as guided light. The light guide 624 may be a plate light guide, in some embodiments. According to various embodiments, the light guide 624 is configured to guide the guided light along a length of the light guide 624 according to total internal reflection. A general propagation direction of the guided light within the light guide 624 is illustrated by a bold arrow in FIG. 6B. In some embodiments, the guided light may be guided in the propagation direction at a non-zero propagation angle and may comprise collimated light that is collimated according to a predetermined collimation factor σ, as illustrated in FIG. 6B.

In embodiments that include the light guide 624, a multibeam element 622 of the multibeam element array may be configured to scatter out a portion of the guided light from within the light guide 624 and to direct the scattered out portion away from an emission surface to provide the directional emitted light 602″, as illustrated in FIG. 6B. For example, the guided light portion may be scattered out by the multibeam element 622 through the first surface. Further, as illustrated in FIGS. 6A-6C, a second surface of the multiview backlight 620 opposite to the first surface may be adjacent to the planar light-emitting surface of the broad-angle backlight 610, according to various embodiments. Further, the multiview backlight 620 may be substantially transparent (e.g., in at least the 2D mode) to allow the broad-angle emitted light 602′ from the broad-angle backlight 610 to pass or be transmitted through a thickness of the multiview backlight 620, as illustrated in FIG. 6A by the dashed arrows that originate at the broad-angle backlight 610 and subsequently pass through the multiview backlight 620.

In some embodiments (e.g., as illustrated in FIGS. 6A-6C), the multiview backlight 620 may further comprise a light source 626. As such, the multiview backlight 620 may be an edge-lit backlight, for example. According to various embodiments, the light source 626 is configured to provide the light to be guided within light guide 624. In various embodiments, the light source 626 may comprise substantially any source of light (e.g., optical emitter) including, but not limited to, one or more light emitting diodes (LEDs) or a laser (e.g., laser diode). In some embodiments, the light source 626 may comprise an optical emitter configured to produce a substantially monochromatic light having a narrowband spectrum denoted by a particular color. In particular, the color of the monochromatic light may be a primary color of a particular color space or color model (e.g., a red-green-blue (RGB) color model). In other examples, the light source 626 may be a substantially broadband light source configured to provide substantially broadband or polychromatic light. For example, the light source 626 may provide white light. In some embodiments, the light source 626 may comprise a plurality of different optical emitters configured to provide different colors of light. The different optical emitters may be configured to provide light having different, color-specific, non-zero propagation angles of the guided light corresponding to each of the different colors of light. As illustrated in FIG. 6B, activation of the multiview backlight 620 may comprise activating the light source 626.

According to some embodiments (e.g., as illustrated in FIGS. 6A-6C), multibeam elements 622 of the multibeam element array may be located at the first surface of the light guide 624 (e.g., adjacent to the first surface of the multiview backlight 620). In other embodiments (not illustrated), the multibeam elements 622 may be located within the light guide 624. In yet other embodiments (not illustrated), the multibeam elements 622 may be located at or on the second surface of the light guide 624 (e.g., adjacent to the second surface of the multiview backlight 620). Further, a size of the multibeam element 622 is comparable to a size of a light valve of the multiview display 600. In some embodiments, the size of the multibeam element 622 may be between about one quarter and two times the light valve size.

As mentioned above and also as illustrated in FIGS. 6A-6C, the multiview display 600 further comprises an array of light valves 630. In various embodiments, any of a variety of different types of light valves may be employed as the light valves 630 of the light valve array including, but not limited to, one or more of liquid crystal light valves, electrophoretic light valves, and light valves based on or employing electrowetting. Further, as illustrated, there may be one unique plurality of light valves 630 for each multibeam element 622 of the array of multibeam elements. The unique plurality of light valves 630 may correspond to a multiview pixel of the time-multiplexed multimode display 600, for example. According to some embodiments, the comparable sizes of the multibeam element 622 and the light valve 630 may be chosen to reduce, or in some examples to minimize, dark zones between views of the multiview display, while at the same time reducing, or in some examples minimizing, an overlap between views of the multiview display or equivalent of the multiview image.

According to various embodiments, the multibeam elements 622 of the multiview backlight 620 may comprise any of a number of different structures configured to scatter out a portion of the guided light. For example, the different structures may include, but are not limited to, diffraction gratings, micro-reflective elements, micro-refractive elements, or various combinations thereof. In some embodiments, the multibeam element 622 comprising a diffraction grating is configured to diffractively couple or scatter out the guided light portion as the directional emitted light 602″ comprising a plurality of directional light beams having the different principal angular directions. In some embodiments, a diffraction grating of a multibeam element may comprise a plurality of individual sub-gratings. In other embodiments, the multibeam element 622 comprising a micro-reflective element is configured to reflectively couple or scatter out the guided light portion as the plurality of directional light beams, or the multibeam element 622 comprising a micro-refractive element is configured to couple or scatter out the guided light portion as the plurality of directional light beams by or using refraction (i.e., refractively scatter out the guided light portion).

Figure 7:
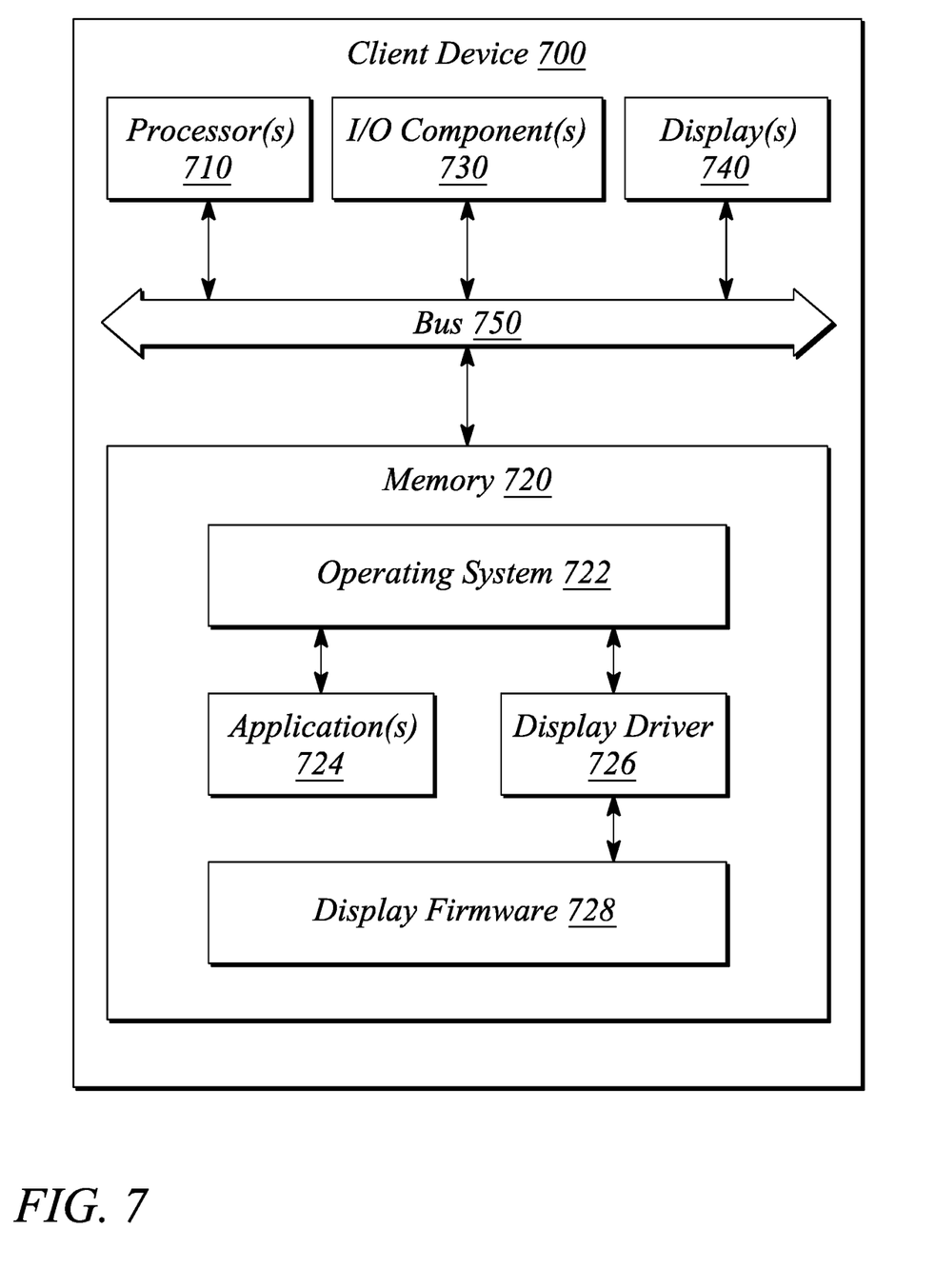
FIG. 7 illustrates a block diagram of a client device in an example, according to an embodiment consistent with the principles described herein.

In some embodiments, the light field camera system 500 of FIG. 5 may be implemented in or using a client device. FIG. 7 illustrates a block diagram of a client device 700 in an example, according to an embodiment consistent with the principles described herein. The light field camera system 500 may comprise the client device 700, for example. For example, the processor 520 and memory 530 of the light field camera system 500 may be part of the client device 700.

As illustrated, the client device 700 comprises a system of components that carry out various computing operations for a user of the client device 700. The client device 700 may be a laptop, tablet, smart phone, touch screen system, intelligent display system, or other client device. The client device 700 may include various components such as, for example, a processor(s) 710, a memory 720, input/output (I/O) component(s) 730, a display 740, and potentially other components. These components may couple to a bus 750 that serves as a local interface to allow the components of the client device 700 to communicate with each other. While the components of the client device 700 are shown to be contained within the client device 700, it should be appreciated that at least some of the components may couple to the client device 700 through an external connection. For example, components may externally plug into or otherwise connect with the client device 700 via external ports, sockets, plugs, or connectors.

A processor 710 may be a central processing unit (CPU), graphics processing unit (GPU), any other integrated circuit that performs computing processing operations, or any combination thereof. The processor(s) 710 may include one or more processing cores. The processor(s) 710 comprises circuitry that executes instructions. Instructions include, for example, computer code, programs, logic, or other machine-readable instructions that are received and executed by the processor(s) 710 to carry out computing functionality that are embodied in the instructions. The processor(s) 710 may execute instructions to operate on data. For example, the processor(s) 710 may receive input data (e.g., an image), process the input data according to an instruction set, and generate output data (e.g., a processed image). As another example, the processor(s) 710 may receive instructions and generate new instructions for subsequent execution. The processor 710 may comprise the hardware to implement a graphics pipeline that renders output from a renderer. For example, the processor(s) 710 may comprise one or more GPU cores, vector processors, scaler processes, or hardware accelerators.

The memory 720 may include one or more memory components. The memory 720 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 710.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 720 may refer to the combination of volatile and nonvolatile memory used to store instructions as well as data. For example, data and instructions may be stored in nonvolatile memory and loaded into volatile memory for processing by the processor(s) 710. The execution of instructions may include, for example, a compiled program that is translated into machine code in a format that can be loaded from nonvolatile memory into volatile memory and then run by the processor 710, source code that is converted in suitable format such as object code that is capable of being loaded into volatile memory for execution by the processor 710, or source code that is interpreted by another executable program to generate instructions in volatile memory and executed by the processor 710, etc. Instructions may be stored or loaded in any portion or component of the memory 720 including, for example, RAM, ROM, system memory, storage, or any combination thereof.

While the memory 720 is shown as being separate from other components of the client device 700, it should be appreciated that the memory 720 may be embedded or otherwise integrated, at least partially, into one or more components. For example, the processor(s) 710 may include onboard memory registers or cache to perform processing operations.

I/O component(s) 730 include, for example, touch screens, speakers, microphones, buttons, switches, dials, camera, sensors, accelerometers, or other components that receive user input or generate output directed to the user. I/O component(s) 730 may receive user input and convert it into data for storage in the memory 720 or for processing by the processor(s) 710. I/O component(s) 730 may receive data outputted by the memory 720 or processor(s) 710 and convert them into a format that is perceived by the user (e.g., sound, tactile responses, visual information, etc.). The I/O components 730 may include one or more physical cameras coupled to the client device. The client device 700 may control the baseline of the cameras as well as their ability to focus.

A specific type of I/O component 730 is a display 740. The display 740 may include a multiview display (e.g., multiview display 100), a multiview display combined with a 2D display, or any other display that presents images. A capacitive touch screen layer serving as an I/O component 730 may be layered within the display to allow a user to provide input while contemporaneously perceiving visual output. The processor(s) 710 may generate data that is formatted as an image for presentation on the display 740. The processor(s) 710 may execute instructions to render the image on the display for being perceived by the user.

The bus 750 facilitates communication of instructions and data between the processor(s) 710, the memory 720, the I/O component(s) 730, the display 740, and any other components of the client device 700. The bus 750 may include address translators, address decoders, fabric, conductive traces, conductive wires, ports, plugs, sockets, and other connectors to allow for the communication of data and instructions.

The instructions within the memory 720 may be embodied in various forms in a manner that implements at least a portion of the software stack. For example, the instructions may be embodied as an operating system 722, an application(s) 724, a device driver (e.g., a display driver 726), firmware (e.g., display firmware 728), or other software components. The operating system 722 is a software platform that supports the basic functions of the client device 700, such as scheduling tasks, controlling I/O components 730, providing access to hardware resources, managing power, and supporting applications 724.

An application(s) 724 executes on the operating system 722 and may gain access to hardware resources of the client device 700 via the operating system 722. In this respect, the execution of the application(s) 724 is controlled, at least in part, by the operating system 722. The application(s) 724 may be a user-level software program that provides high-level functions, services, and other functionality to the user. In some embodiments, an application 724 may be a dedicated 'app' downloadable or otherwise accessible to the user on the client device 700. The user may launch the application(s) 724 via a user interface provided by the operating system 722. The application(s) 724 may be developed by developers and defined in various source code formats. The applications 724 may be developed using a number of programming or scripting languages such as, for example, C, C++, C#, Objective C, Java®, Swift, JavaScript, Perl, PHP, Visual Basic®, Python®, Ruby, Go, or other programming languages. The application(s) 724 may be compiled by a compiler into object code or interpreted by an interpreter for execution by the processor(s) 710. The application 724 may include a renderer or other graphics rendering engine.

Device drivers such as, for example, the display driver 726, include instructions that allow the operating system 722 to communicate with various I/O components 730. Each I/O component 730 may have its own device driver. Device drivers may be installed such that they are stored in storage and loaded into system memory. For example, upon installation, a display driver 726 translates a high-level display instruction received from the operating system 722 into lower level instructions implemented by the display 740 to display an image.

Firmware, such as, for example, display firmware 728, may include machine code or assembly code that allows an I/O component 730 or display 740 to perform low-level operations. Firmware may convert electrical signals of particular component into higher level instructions or data. For example, display firmware 728 may control how a display 740 activates individual pixels at a low level by adjusting voltage or current signals. Firmware may be stored in nonvolatile memory and executed directly from nonvolatile memory. For example, the display firmware 728 may be embodied in a ROM chip coupled to the display 740 such that the ROM chip is separate from other storage and system memory of the client device 700. The display 740 may include processing circuitry for executing the display firmware 728.

The operating system 722, application(s) 724, drivers (e.g., display driver 726), firmware (e.g., display firmware), and potentially other instruction sets may each comprise instructions that are executable by the processor(s) 710 or other processing circuitry of the client device 700 to carry out the functionality and operations discussed above. Although the instructions described herein may be embodied in software or code executed by the processor(s) 710 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments of the principles described a non-transitory, computer-readable storage medium storing executable instructions that, when executed by a processor of a computer system, performs operations of determining a baseline and convergence distance of a multiple camera rig is provided. In particular, instructions that carry out the functionality and operations discussed above may be embodied in a non-transitory, computer-readable storage medium. For example, some embodiments may be directed to a non-transitory, computer-readable storage medium storing executable instructions that, when executed by a processor (e.g., processor 710) of a computing system (e.g., the client device 700) cause the processor to perform various functions discussed above, including various operations to dynamically and automatically update a convergence distance or baseline of a multiple camera rig.

In particular, operations performed by processor executing instructions stored in the non-transitory, computer-readable storage medium may comprise determining a set or plurality of sample point depths representing distances between the multiple camera rig and a plurality of sample points in a three dimensional (3D) scene within a field of view of the multiple camera rig, the convergence distance being set as an average depth of the plurality of sample point depths. The operations may further comprise determining a minimum sample point depth of the plurality of sample point depths, the baseline being set as a negative inverse of a difference between the minimum sample point depth and the convergence distance. In some embodiments, determining the plurality of sample point depths comprises one or more of from a depth map of an image representing the 3D scene, using a disparity map to compute the depths, performing ray casting within the 3D scene to determine the sample point depths within the 3D scene, and using a depth sensor to measure distances between the multiple camera rig and objects within the 3D scene, the objects corresponding to sample points of the plurality of sample points. In some embodiments, the average depth of the plurality of sample point depths is a weighted average, weights of the weighted average being assigned according to a decreasing function of distance from a focal point of the 3D scene.

Herein, a 'non-transitory, computer-readable storage medium' is defined as any medium that can contain, store, or maintain the instructions described herein for use by or in connection with an instruction execution system. For example, the non-transitory, computer-readable storage medium may store instructions for use by or in connection with the light field camera system 500 or the client device 700. Further, the non-transitory, computer-readable storage medium may or may not be part of the client device 700 described above (e.g., part of the memory 720). The instructions stored by the non-transitory, computer-readable storage medium may include, but are not limited to, statements, code, or declarations that may be fetched from the non-transient computer-readable medium and executed by processing circuitry (e.g., the processor 520 or the processor(s) 710). Further, the term 'non-transitory, computer-readable storage medium' explicitly excludes transitory medium including, for example, carrier waves, by definition herein.

According to various embodiments, the non-transitory, computer-readable medium may comprise any one of many physical media such as, for example, magnetic, optical, or semiconductor media. More specific examples of a suitable non-transitory, computer-readable medium may include, but are not limited to, magnetic tapes, magnetic floppy diskettes, magnetic hard drives, memory cards, solid-state drives, USB flash drives, or optical discs. Also, the non-transitory, computer-readable medium may be a random access memory (RAM) including, for example, static random access memory (SRAM) and dynamic random access memory (DRAM), or magnetic random access memory (MRAM). In addition, the non-transitory, computer-readable medium may be a read-only memory (ROM), a programmable read-only memory (PROM), an erasable programmable read-only memory (EPROM), an electrically erasable programmable read-only memory (EEPROM), or other type of memory device.

The client device 700 may perform any of the operations or implement the functionality described above. For example, the process flows discussed above may be performed by the client device 700 that executes instructions and processes data. While the client device 700 is shown as a single device, embodiments are not so limited. In some embodiments, the client device 700 may offload processing of instructions in a distributed manner such that a plurality of other client devices 700 or other computing devices that operate together to execute instructions that may be stored or loaded in a distributed arranged. For example, at least some instructions or data may be stored, loaded, or executed in a cloud-based system that operates in conjunction with the client device 700.

Thus, there have been described examples and embodiments of setting a baseline and a convergence distance of a multiple camera rig with application to a light field camera system. In some embodiments, the baseline and convergence distance may be determined dynamically or in real-time based on the depths of points within a camera view. It should be understood that the above-described examples are merely illustrative of some of the many specific examples that represent the principles described herein. Clearly, those skilled in the art can readily devise numerous other arrangements without departing from the discussion presented herein.

What is claimed is:

1. A method of setting a baseline and a convergence distance of a multiple camera rig, the method comprising:
   determining a plurality of sample point depths representing distances between the multiple camera rig and a plurality of sample points in a three-dimensional scene within a field of view of the multiple camera rig;
   setting the convergence distance to be an average sample point depth of the plurality of sample point depths;
   determining a minimum sample point depth of the plurality of sample point depths; and
   setting the baseline to be a negative inverse of a difference between the minimum sample point depth and the convergence distance.

2. The method of setting a baseline and a convergence distance of claim 1, wherein determining the plurality of sample point depths comprises performing ray casting within the three-dimensional scene and recording hit distances for each sample point of the plurality of sample points.

3. The method of setting a baseline and a convergence distance of claim 1, wherein determining the plurality of sample point depths comprises computing the sample point depths from a disparity map of the three-dimensional scene for each sample point of the plurality of sample points.

4. The method of setting a baseline and a convergence distance of claim 3, wherein computing the sample point depths further comprises using image disparity between images captured by different cameras of the multiple camera rig and forming a disparity map of the three-dimensional scene from the image disparity.

5. The method of setting a baseline and a convergence distance of claim 1, wherein determining the plurality of sample point depths comprises using a depth sensor to measure distances between the multiple camera rig and objects within the three-dimensional scene, the objects corresponding to sample points of the plurality of sample points.

6. The method of setting a baseline and a convergence distance of claim 5, wherein the depth sensor comprises one of a laser distance sensor and a time-of-flight distance sensor.

7. The method of setting a baseline and a convergence distance of claim 1, wherein the average sample point depth is a weighted average having weights assigned according to a decreasing function of distance from a focal point within the three-dimensional scene.

8. The method of setting a baseline and a convergence distance of claim 7, wherein the weights of the weighted average are assigned according to a gaussian distribution centered on the focal point.

9. The method of setting a baseline and a convergence distance of claim 1, wherein the multiple camera rig comprises a plurality of virtual cameras, the three-dimensional scene being a three-dimensional model.

10. The method of setting a baseline and a convergence distance of claim 1, wherein the multiple camera rig comprises a plurality of physical cameras, the three-dimensional scene representing a physical scene imaged by cameras of the plurality of physical cameras.

11. The method of setting a baseline and a convergence distance of claim 1, wherein the multiple camera rig comprises a camera that is moved between a plurality of locations to capture images that form the three-dimensional scene.

12. A light field camera system comprising:
    a multiple camera rig comprising a plurality of cameras;
    a processor; and
    a memory configured to store instructions that when executed by the processor implement:
       determining a plurality of sample point depths representing distances between the multiple camera rig and a plurality of sample points in a three-dimensional scene within a field of view of the multiple camera rig; and
       setting a convergence distance and a baseline of the multiple camera rig,
    wherein the convergence distance is an average sample point depth of the plurality of sample point depths and the baseline is a negative inverse of a minimum sample point depth of the plurality of sample point depths minus the convergence distance.

13. The light field camera system of claim 12, wherein the plurality of sample point depths is determined one or more of from a depth map of an image representing the three-dimensional scene, using a disparity map to compute the sample point depths, performing ray casting within the three-dimensional scene to determine the sample point depths within the three-dimensional scene.

14. The light field camera system of claim 12, wherein the plurality of sample point depths is determined using a depth sensor to measure distances between the multiple camera rig and objects within the three-dimensional scene, the objects corresponding to sample points of the plurality of sample points.

15. The light field camera system of claim 12, wherein the average sample point depth of the plurality of sample point depths is a weighted average, weights of the weighted average being assigned according to a decreasing function of distance from a focal point of the three-dimensional scene.

16. The light field camera system of claim 12, wherein a camera of the plurality of cameras is a virtual camera, the three-dimensional scene being a three-dimensional model.

17. The light field camera system of claim 12, wherein cameras of the plurality of cameras of the multiple camera rig comprises physical cameras, the three-dimensional scene representing a physical scene imaged by the physical cameras.

18. The light field camera system of claim 12, further comprising a multiview display, the convergence distance corresponding to a zero disparity plane of the multiview display.

19. A non-transitory, computer-readable storage medium storing executable instructions that, when executed by a processor of a computer system, performs operations of determining a baseline and convergence distance of a multiple camera rig, the operations comprising:

determining a plurality of sample point depths representing distances between the multiple camera rig and a plurality of sample points in a three-dimensional scene within a field of view of the multiple camera rig, the convergence distance being set as an average sample point depth of the plurality of sample point depths; and determining a minimum sample point depth of the plurality of sample point depths, the baseline being set as a negative inverse of a difference between the minimum sample point depth and the convergence distance.

20. The non-transitory, computer-readable storage medium of claim 19, wherein determining the plurality of sample point depths comprises one or more of from a depth map of an image representing the three-dimensional scene, using a disparity map to compute the sample point depths, performing ray casting within the three-dimensional scene to determine the sample point depths within the three-dimensional scene, and using a depth sensor to measure distances between the multiple camera rig and objects within the three-dimensional scene, the objects corresponding to sample points of the plurality of sample points.

21. The non-transitory, computer-readable storage medium of claim 19, wherein the average sample point depth of the plurality of sample point depths is a weighted average, weights of the weighted average being assigned according to a decreasing function of distance from a focal point of the three-dimensional scene.

* * * * *